US009427135B2

(12) United States Patent
Audet et al.

(10) Patent No.: US 9,427,135 B2
(45) Date of Patent: Aug. 30, 2016

(54) SINK DISH DRAINER SET

(71) Applicant: United Comb & Novelty Corporation, Leominster, MA (US)

(72) Inventors: Ronald Audet, North Smithfield, RI (US); Sean Curran, Leominster, MA (US); Theresa Savoia Scalzi, Concord, MA (US)

(73) Assignee: United Comb + Novelty Corporation, Leominster, MA (US)

( * ) Notice: Subject to any disclaimer, the term of this patent is extended or adjusted under 35 U.S.C. 154(b) by 10 days.

(21) Appl. No.: 14/270,707

(22) Filed: May 6, 2014

(65) Prior Publication Data
US 2014/0332479 A1    Nov. 13, 2014

Related U.S. Application Data

(60) Provisional application No. 61/820,248, filed on May 7, 2013.

(51) Int. Cl.
*A47L 19/04* (2006.01)
*A47J 47/16* (2006.01)
*A47J 47/20* (2006.01)

(52) U.S. Cl.
CPC ............. *A47L 19/04* (2013.01); *A47J 47/16* (2013.01); *A47J 47/20* (2013.01)

(58) Field of Classification Search
CPC ....... A47L 19/00; A47L 19/02; A47L 19/04; A47J 7/20; A47B 81/04
See application file for complete search history.

(56) References Cited

U.S. PATENT DOCUMENTS

| | | | | |
|---|---|---|---|---|
| 184,672 | A * | 11/1876 | Stone | 211/41.3 |
| 1,341,717 | A * | 6/1920 | Lynch | 211/41.3 |
| 1,371,253 | A * | 3/1921 | Lynch | 220/572 |
| 2,443,404 | A * | 6/1948 | Tallarico | 211/41.4 |
| 2,454,516 | A * | 11/1948 | Laureyns | A47J 47/16 211/40 |
| 2,479,118 | A * | 8/1949 | Jenness | 211/41.5 |
| 2,936,898 | A * | 5/1960 | Miguez | 211/41.3 |
| 3,442,395 | A * | 5/1969 | Taylor | 211/41.3 |
| 3,889,837 | A * | 6/1975 | Wilson | 220/7 |
| 4,531,641 | A * | 7/1985 | Archambault | 211/41.3 |
| 4,592,471 | A * | 6/1986 | Bross | A47J 47/16 108/61 |
| 5,158,184 | A * | 10/1992 | Craft et al. | 211/41.3 |
| 5,385,261 | A * | 1/1995 | Lippisch et al. | 220/572 |
| 5,588,539 | A * | 12/1996 | Belden et al. | 211/41.3 |
| D383,273 | S * | 9/1997 | Hampshire | D32/55 |
| 6,763,954 | B1 * | 7/2004 | Travers et al. | 211/41.3 |
| 7,407,059 | B2 * | 8/2008 | Sullivan et al. | 211/41.3 |
| 8,631,948 | B2 | 1/2014 | Yang et al. | |
| 8,973,763 | B2 * | 3/2015 | Pargansky | 211/41.3 |
| 2007/0090063 | A1 * | 4/2007 | Schmidt | 211/41.3 |
| 2010/0059460 | A1 * | 3/2010 | Mulaw | 211/41.3 |

(Continued)

FOREIGN PATENT DOCUMENTS

| | | | | |
|---|---|---|---|---|
| DE | 706307 | C * | 5/1941 | |
| FR | 641112 | A * | 7/1928 | A47L 19/00 |
| GB | 191420127 | A * | 7/1915 | |

(Continued)

*Primary Examiner* — Stanton L Krycinski
(74) *Attorney, Agent, or Firm* — Brian M. Dingman; Dingman IP Law, PC

(57) ABSTRACT

A sink dish drainer set having a mat and a rack which may be coupled such that the rack sits on the mat in a particular location, the rack including at least one plate support area that sits above channels within at least one raised rib on the mat.

14 Claims, 10 Drawing Sheets

(56) References Cited

U.S. PATENT DOCUMENTS

2010/0065517 A1* 3/2010 Lam .......................... 211/41.3
2012/0138550 A1* 6/2012 Wisniewski ................ 211/41.3

FOREIGN PATENT DOCUMENTS

| GB | 160617 A | * | 3/1921 | .............. A47J 47/16 |
| GB | 446807 A | * | 5/1936 | ............. A47L 19/04 |

* cited by examiner

SINK DISH DRAINER SET

CROSS-REFERENCE TO RELATED APPLICATIONS

This application claims benefit from U.S. Provisional Patent Application No. 61/820,248, filed May 7, 2013, the contents of which are incorporated herein by reference.

BACKGROUND

Dish racks or dishwashing sets have been available for many years with several orientations to accommodate the sizes and shapes of a variety of dishes, plates, cups and utensils. Racks and sets available to the public provide space for the different types of dishware and utensils, however not all designated drying areas arc capable of hosting different types of dishware with adequate support, because drying areas arc typically designed for particular types of dishware or utensils. In other words, the plate areas are designed for plates and the dish and/or cup areas are designed for dishes and/or cups. Flat areas providing space for cups or dishes do not provide adequate support for the drying of plates. A versatile drying rack is needed which would be beneficial for the drying of cups or other dishware requiring a generally flat louvered drying area, while also providing adequate support for plates when they are placed in the same area for drying.

SUMMARY

Featured herein is a sink dish drainer set of the type which is also sometimes called a dish rack or dishwashing set. The set includes a separate rack and mat, both of which are typically but not necessarily integral injection-molded parts. The two are constructed and arranged to be coupled such that the rack sits on the mat in a particular location. The rack includes a plate support area which is much like other drying racks on the market, with supports for the bottoms and sides of the plates. The rack includes at least one other generally flat louvered surface which can efficiently support various items such as cups, glasses, bowls and utensils. When these items are not present in the area, it can also be used as a plate support area. This flat louvered area sits above features in the mat that are constructed and arranged to help support plates that are located in the generally flat louvered surface area of the rack. In this area the rack includes at least one feature that provides additional support to plates located in the area.

In one aspect is a sink dish drainer set comprising a mat and a rack which may be coupled together with the rack situated in a particular location upon elevated projections on which legs of the rack are situated. The mat is constructed such that it may come in contact with plates in rack drying areas which would otherwise be incapable of providing adequate support for the plates.

Embodiments may include one of the following features, or any combination thereof. The mat support features may comprise channels in which protruding plates rest. The channels may be located in at least one raised rib in the mat and the channels may lie within the raised rib, at right angles to the length of the raised rib.

Another embodiment may include a mat comprising multiple spaced raised ribs in a variety of orientations throughout the area of the mat. A series of channels may exist throughout and perpendicular to, the lengths of the ribs.

Another embodiment may include prongs along the sides of the rack to rest cups or other objects, allowing them to dry while not resting within the body of the rack, thereby providing more space for plates and other objects on the generally flat louvered drying area.

DESCRIPTION OF EXAMPLES

Figure 1:
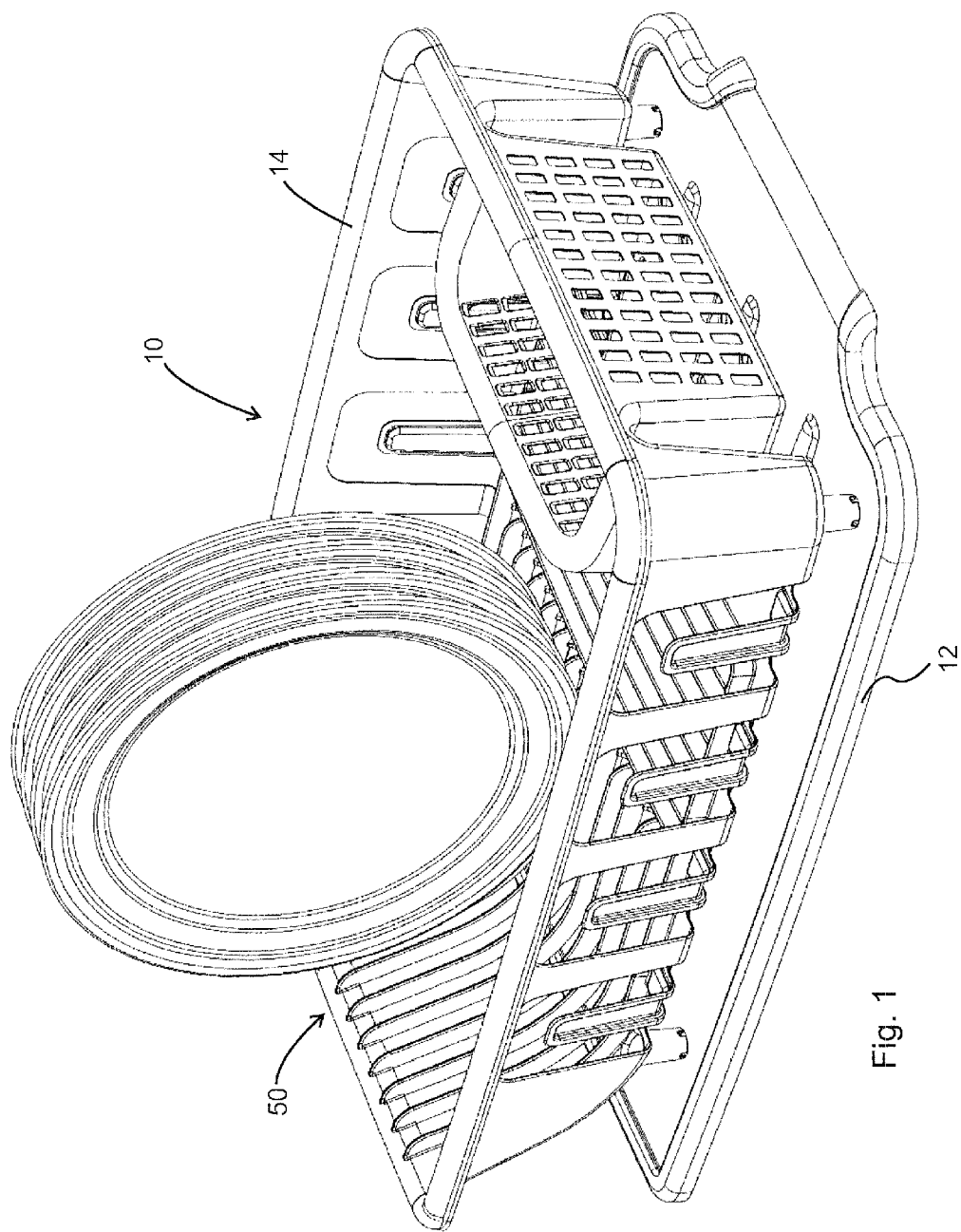
FIG. 1 is a perspective view of a sink dish drainer set with plates located in a first plate support area.
Figure 2:
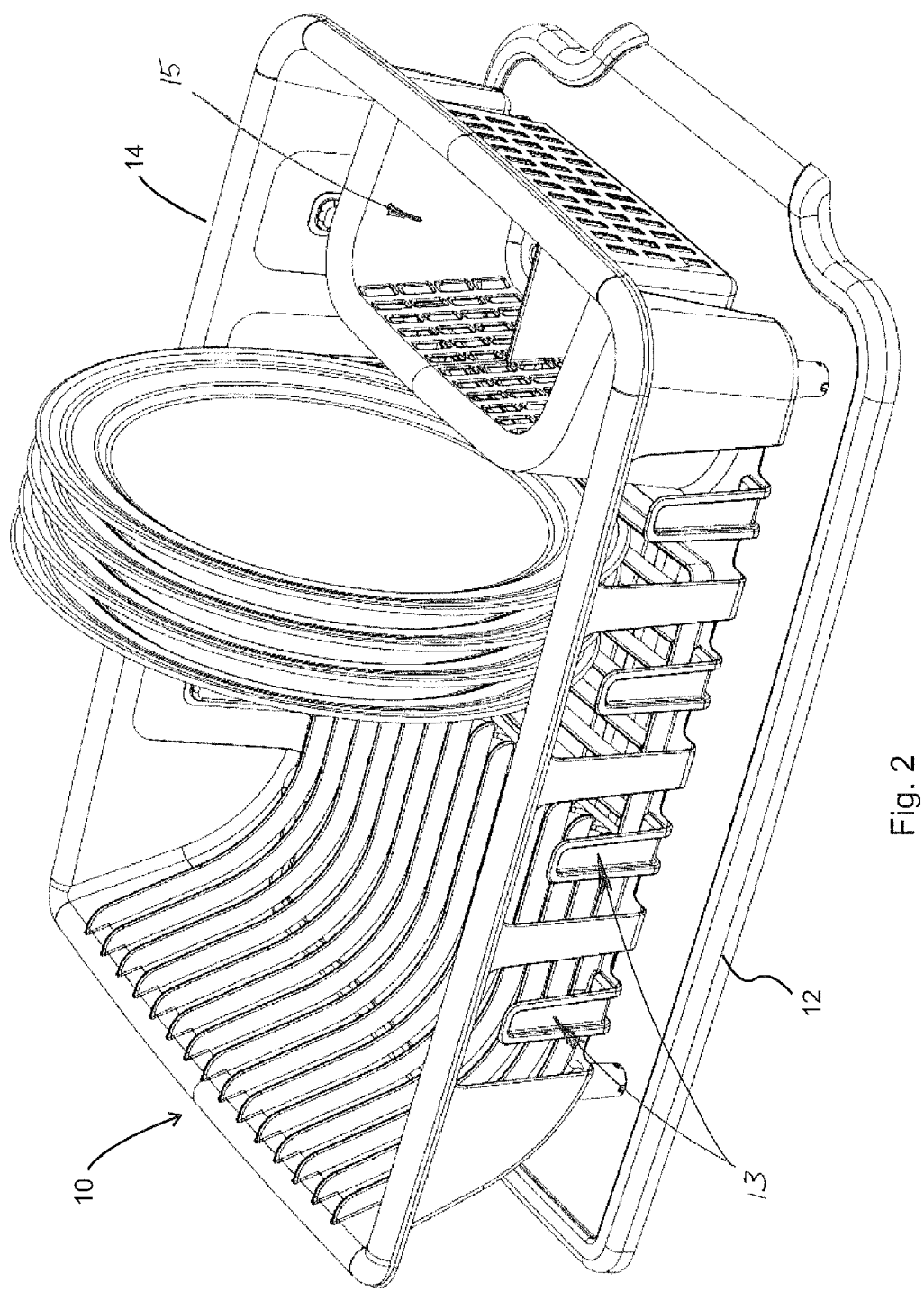
FIG. 2 is a perspective view with plates located in a second plate support area.
Figure 3:
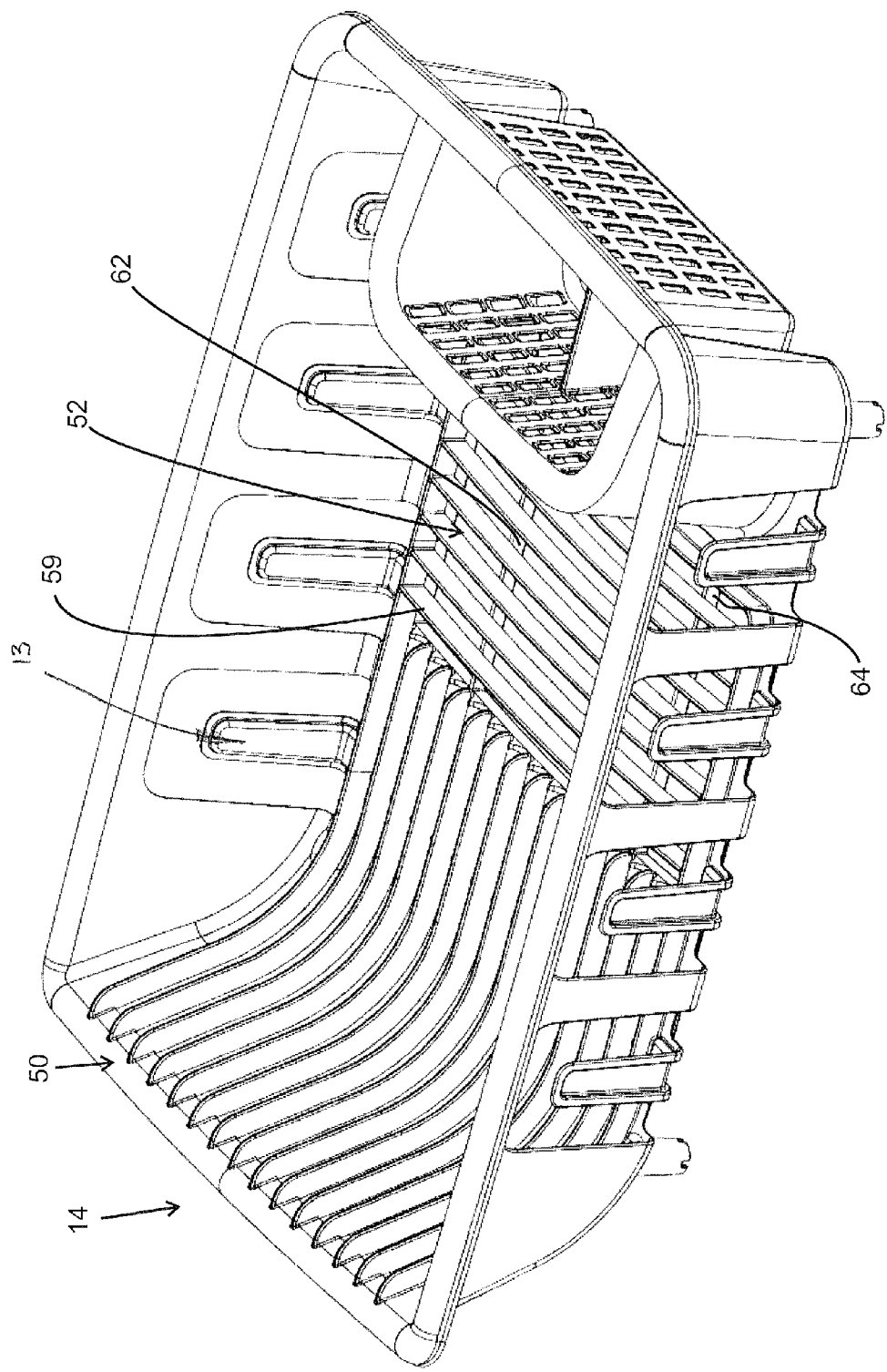
FIG. 3 is a perspective view of the rack.

Sink dish drainer set 10 includes draining mat 12 with a peripheral rim and drainage area 26 as is known in the field. Top surface 20 has projections 21-24 that accept hollow feet built into the bottom of the rack, so that the rack is placed or located properly so as to align a plate support area with the plate support features of the mat, as is explained below. Mat 12 includes at least one area with plate support features. In this example, the plate support features are accomplished by including a raised rib 31 with at least one depression or channel 36 formed therein. Additional ribs 30 and 32 may be included to help stiffen the mat so it is less likely to bow, to provide more plate supports for other potential drying areas, or to provide a raised surface to assist with drainage if the mat is used alone without the rack.

Figure 8:
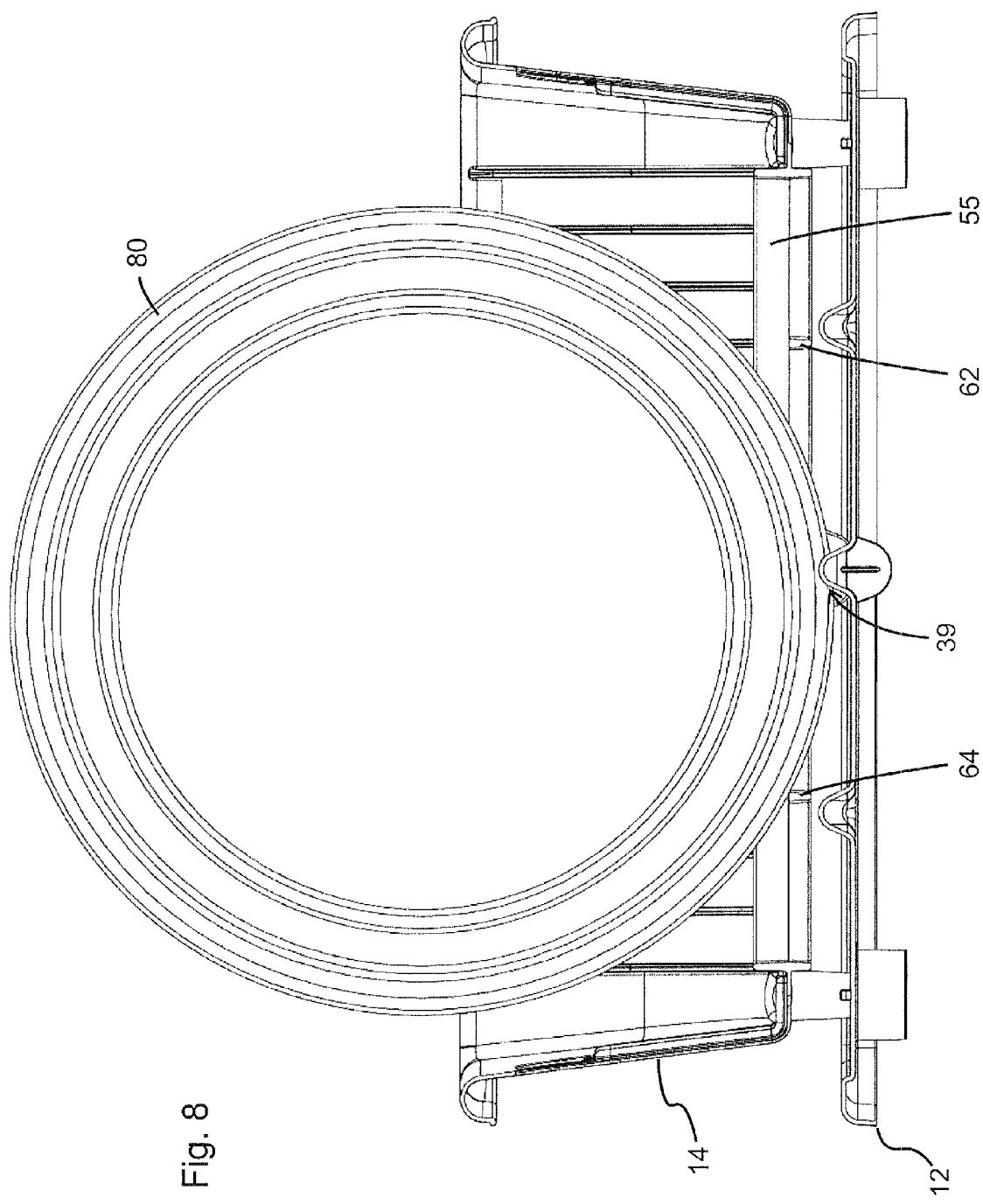
FIG. 8 is a lateral cross-sectional front view of the combination shown in FIG. 7.
Figure 9:
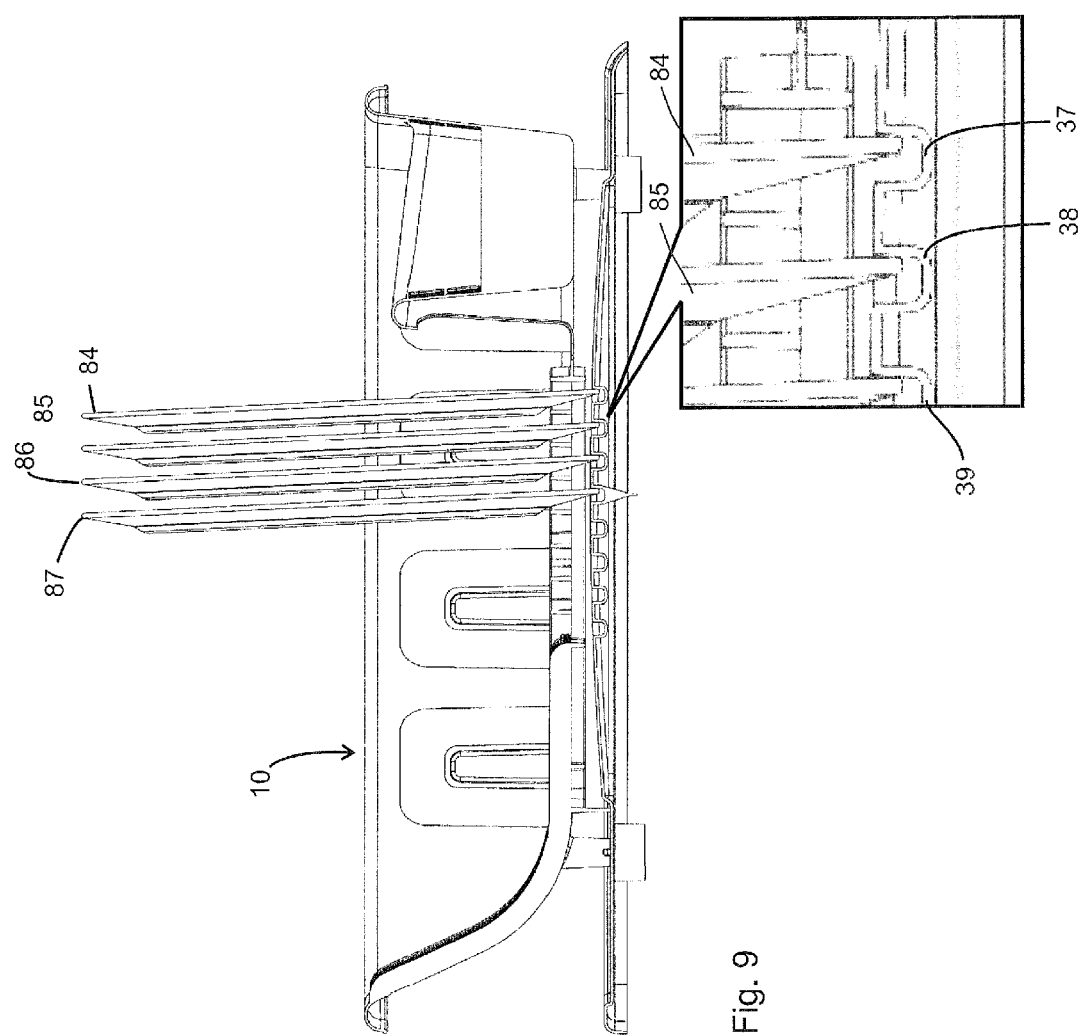
FIG. 9 is a cross-sectional view showing several plates engaged in the second plate support area.

Rack 14 includes features that are commonly found in dish racks such as a receptacle or basket 15 that is adapted to hold utensils, and a primary plate support area 50 that has a series of raised, parallel projecting louvers that support plates in the orientation shown in FIG. 1. Rack 14 defines a second plate support area 52 that comprises a series of parallel louvers 53-59 with their tops located in a plane so as to define a flat region that can support cups and glasses and other objects. Located below and integrally coupled to these transverse louvers 53-59 are spaced ribs 62 and 64 that serve to help support plates located in the second plate support area 52 as best shown in FIGS. 8 and 9. Rack 14 also features upward-facing prongs 13 on its sides to accommodate cups or other objects for drying as is known in the field.

Figure 4A:
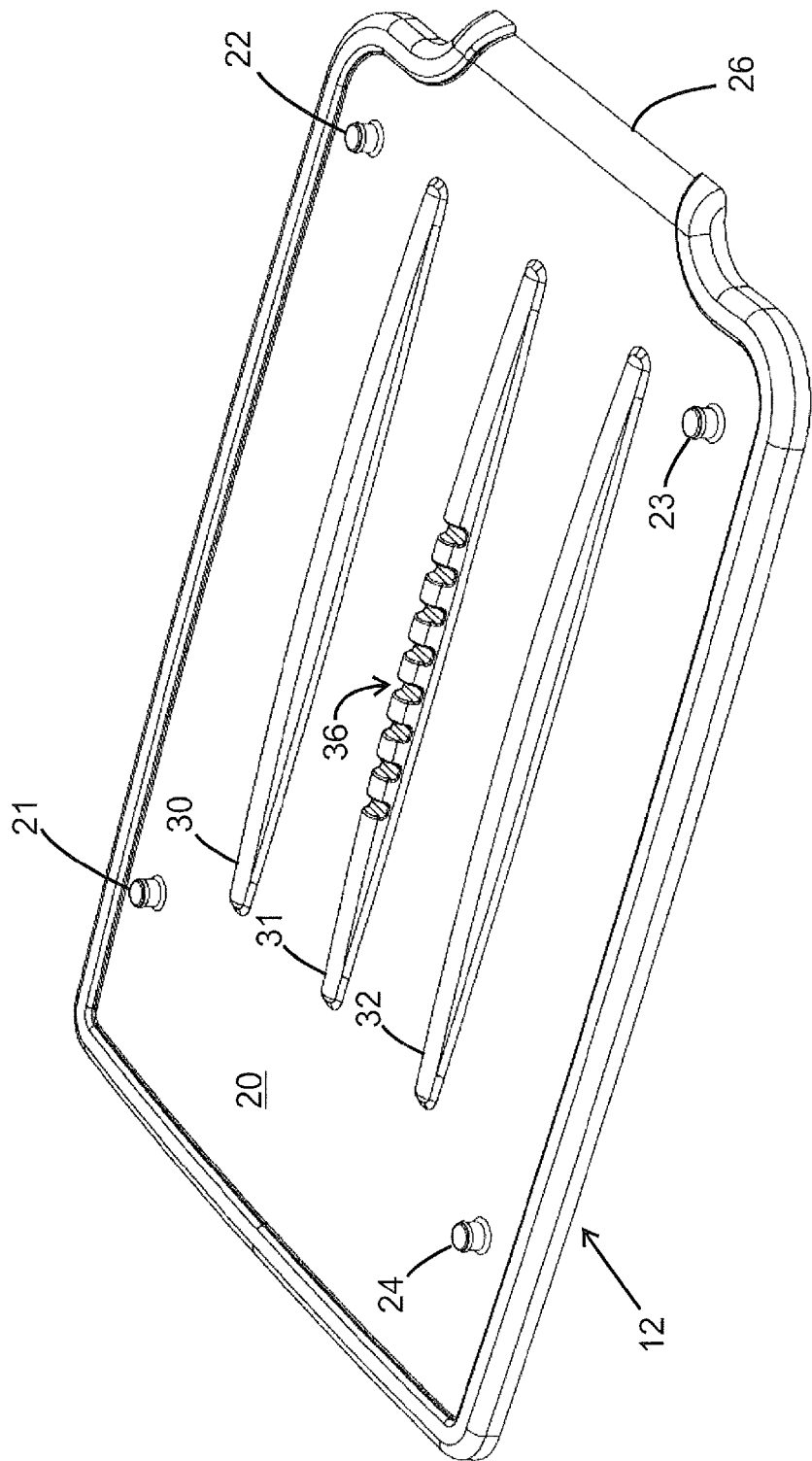
FIG. 4A is a perspective view of the mat.
Figure 4B:
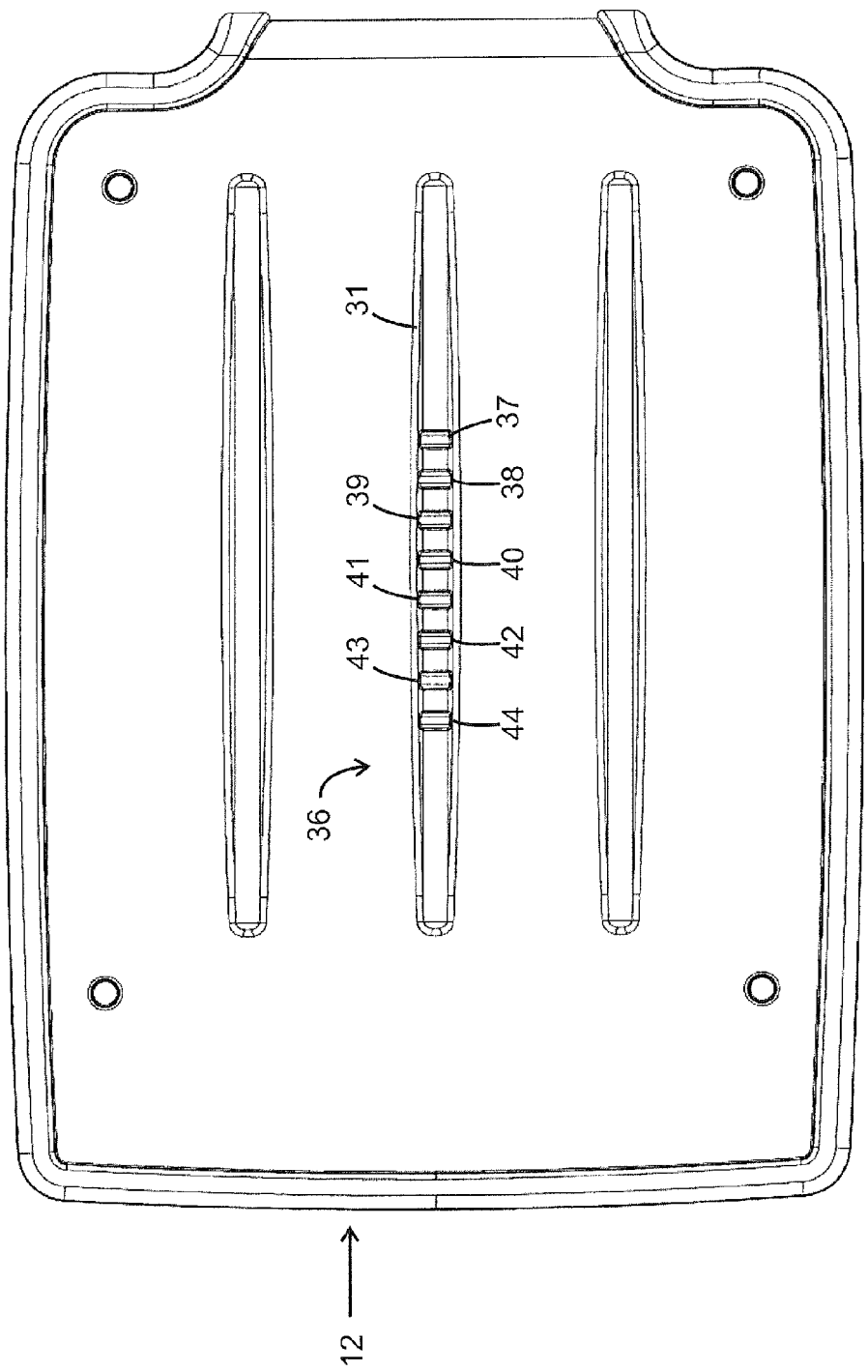
FIG. 4B is a top view of the mat.
Figure 5:
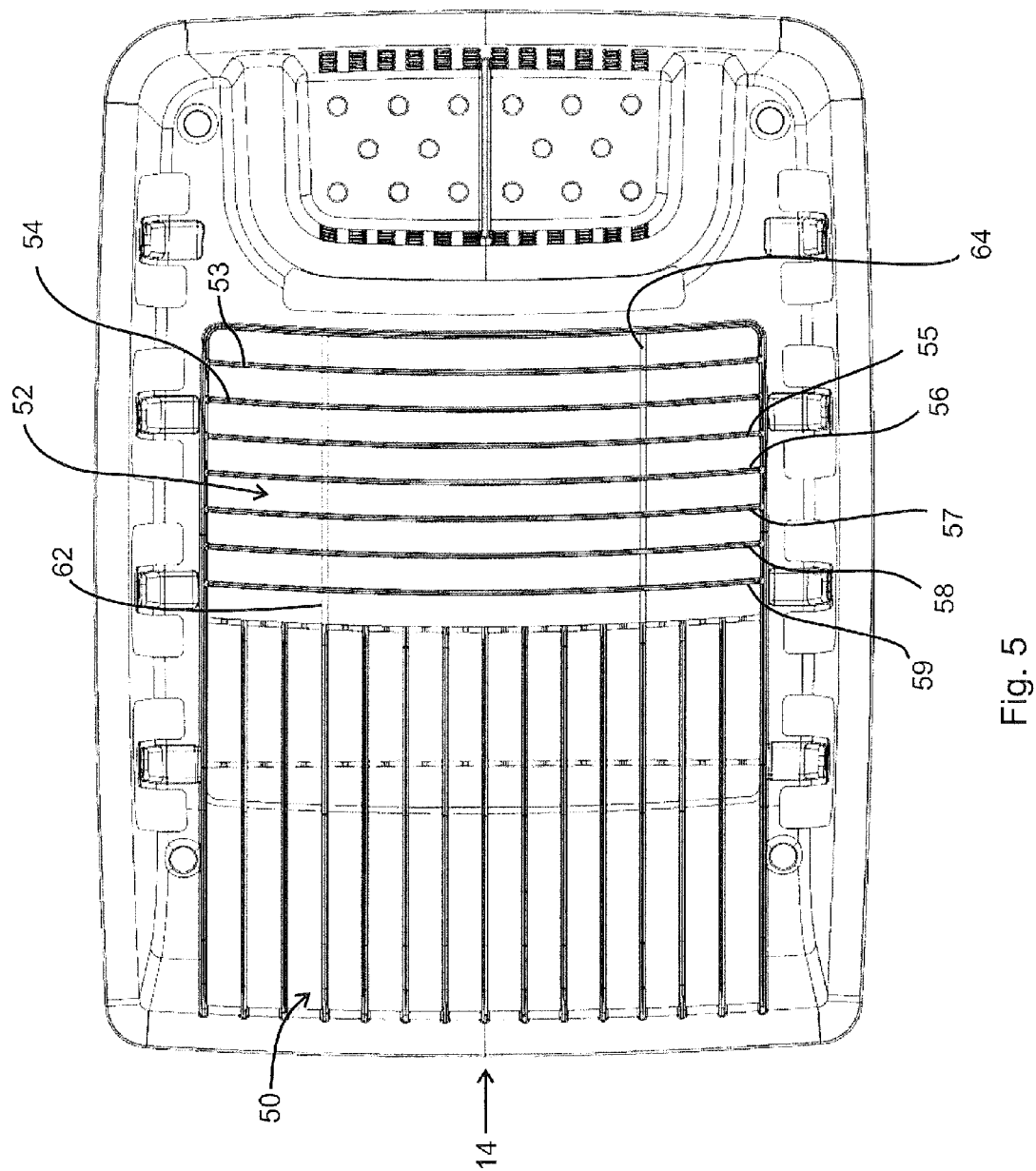
FIG. 5 is a top view of the rack.
Figure 6:
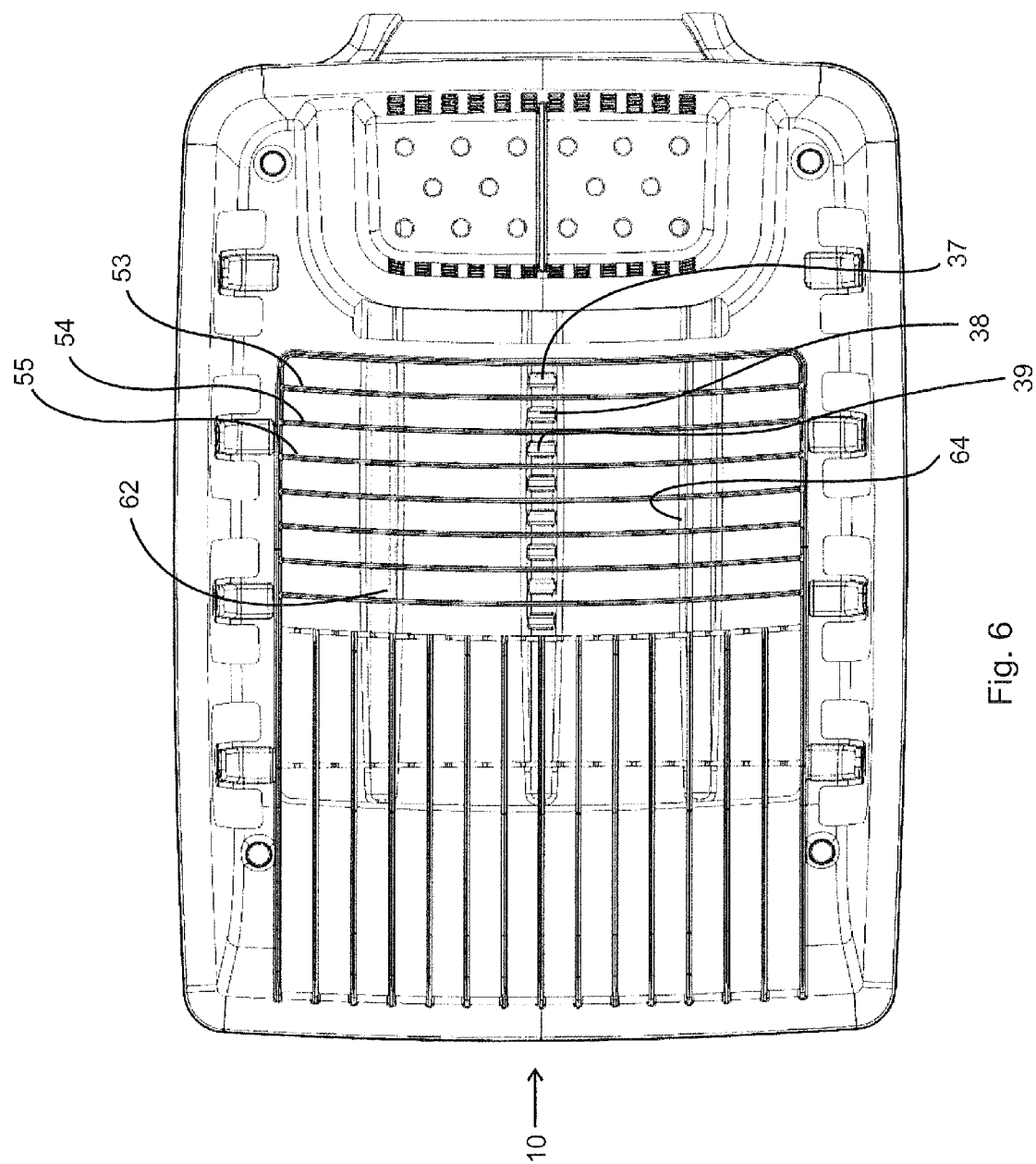
FIG. 6 is a top view of the rack and mat combination.
Figure 7:
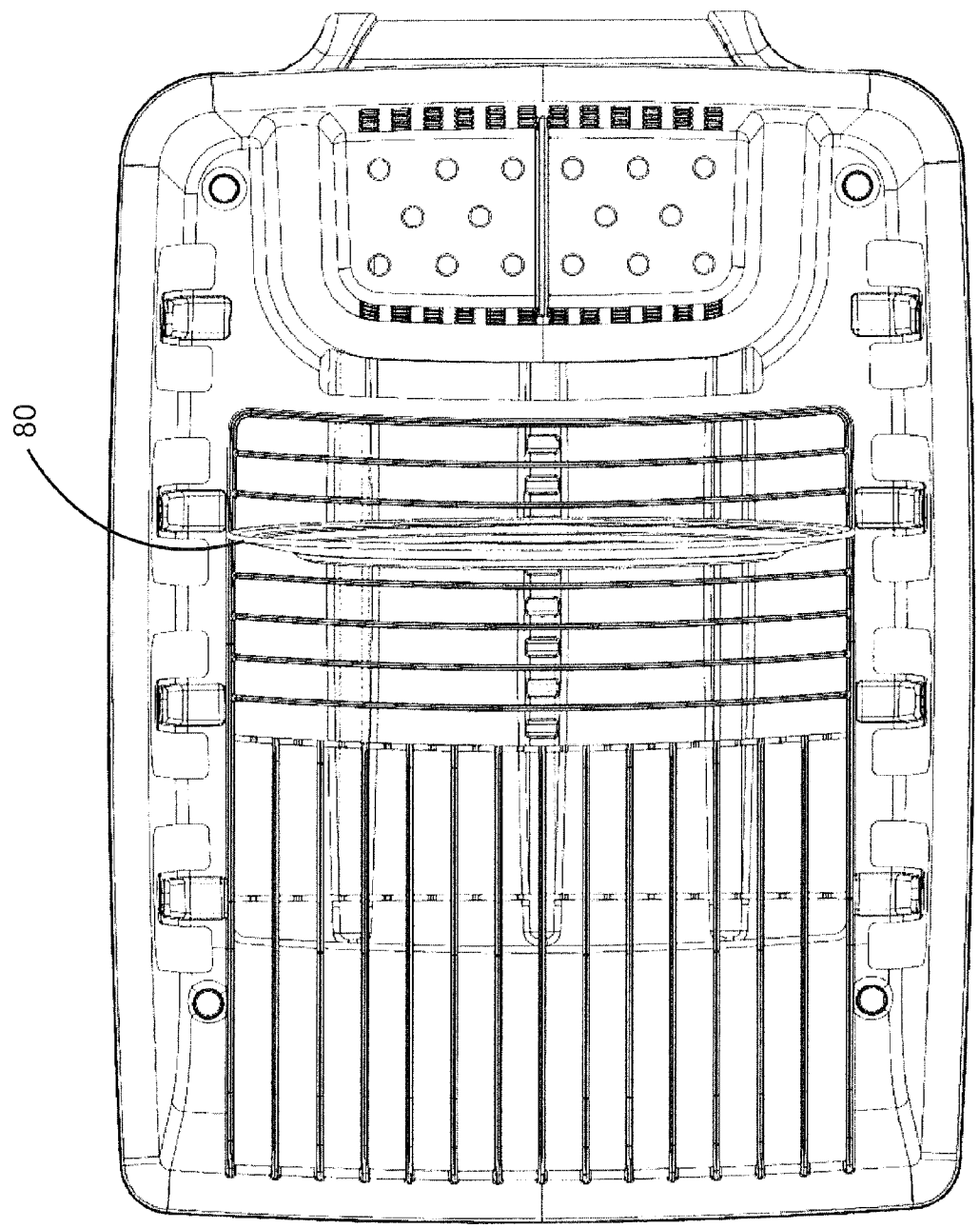
FIG. 7 is a top view similar to that of FIG. 6 but with a single plate in the second plate support area.

In this non-limiting example, rib 31 defines a series of parallel plate support channels 37-44 that are arranged to lie across the length of the raised rib 31, perpendicular to its length, as shown for example in FIG. 4B. These channels are sized and shaped to accept the rim of a typical plate so as to both locate and partially support a plate set therein. Also, projections 21-24 and the corresponding hollow feet of the rack establish a particular orientation between the rack and mat such that channels 37-44 are located between ribs 53-59 as best shown in FIG. 6. Support channels 37-44 and ribs 53-59 thus also provide visual cues to the user as to where to place one or more plates in this second plate support area 52. As shown in FIG. 8, plate 80 is located in channel 39 of mat 12 and is resting against rib 64 of rack 14. If the plate had a larger diameter it might also be resting against rib 62.

Thus, one or both of ribs 62 and 64 serve to support a plate that is located in one of the channels. FIG. 9 shows four plates located in four of the channels.

The plate location and support functions of the mat can be accomplished by other constructions and other structures. For example, posts, ribs or other projections from the bottom 20 of the mat can create plate-receiving slots for other types of dishware. Also, the side-to-side plate support functionality of ribs 62 and 64 of the rack may be accomplished in other manners, for example by thickening the portions of ribs 53-59 in about the locations of where ribs 62 and 64 lie. This function may also be achieved by constructing and arranging various configurations of raised ribs on mat 12 to support various potential configurations of plate support area in rack 14.

Certain aspects of the disclosure are illustrated and described. However, these aspects illustrate the scope of the invention rather than limiting it to the particular illustrated examples. The scope of the invention is supported by the following claims.

What is claimed is:

1. A sink dish drainer set, comprising:
a mat;
a rack;
wherein the mat and the rack are constructed and arranged to be coupled such that the rack sits on the mat in a particular location;
wherein the rack includes at least one plate support area that sits above one or more plate support features in the mat that are constructed and arranged to help to support plates that are located in the respective plate support area;
wherein the plate support features of the mat comprise at least one raised rib on the mat surface, the at least one raised rib comprising a plurality of channels located along the top of the at least one raised rib, the at least one raised rib having an axis oriented such that the at least one raised rib axis intersects a side of the mat incorporating a drainage area from which water can drain from the mat, and;
wherein the rack comprises a plurality of plate support features located in each plate support area that supports plates located in that area,
wherein when the rack is sitting on top of the mat in the particular location a channel of the plurality of channels in the at least one raised rib is located between pairs of plate support features of the plurality of plate support features, so that the plate support features in the rack and the plate support features in the mat can simultaneously support a plate located in the plate support area.

2. The sink dish drainer set of claim 1 wherein the channels lie at right angles to the axis of the raised rib's length.

3. The sink dish drainer set of claim 2 wherein the plurality of plate support features of the rack further comprises a series of parallel louvers that are spaced from and parallel to each other and are perpendicular to the at least one raised rib on the mat.

4. The sink dish drainer set of claim 3 wherein the rack further comprises two spaced ribs that are spaced from and parallel to each other and parallel to the at least one raised rib on the mat, connecting and supporting the louvers between which plates can be inserted.

5. The sink dish drainer set of claim 4 where the tops of the louvers are located in a plane so as to define a flat region on which items can be set.

6. The sink dish drainer set of claim 1, the rack further comprising upward facing prongs along its sides, on which objects can rest.

7. The sink dish drainer set of claim 1 wherein the at least one rib comprises a plurality of raised ribs wherein the plurality of raised ribs are constructed and arranged on the mat to support generally flat kitchen items when the rack is removed from the set.

8. The sink dish drainer set of claim 1 wherein the rack further comprises hollow feet.

9. The sink dish drainer set of claim 8 wherein the mat further comprises projections which accept the hollow feet.

10. The sink dish drainer set of claim 1 wherein the mat further comprises a rim and a drainage area.

11. A sink dish drainer set, comprising:
a mat;
a rack;
wherein the rack has hollow feet;
wherein the mat has projections which accept the hollow feet;
wherein the mat and the rack are constructed and arranged to be coupled such that the rack sits on the mat in a particular location;
wherein the rack includes at least one plate support area that sits above a raised rib on the top surface of the mat, where the raised rib has a plurality of channels located along the top of the raised rib, perpendicular to the axis of the raised rib's length, where the channels are constructed and arranged to support plates located in the at least one plate support area, the raised rib having an axis oriented such that the axis of the raised rib intersects a side of the mat incorporating a drainage area from which water can drain from the mat; and
wherein the rack includes a plurality of support features located in each plate support area that support plates located in that area,
wherein when the rack is sitting on top of the mat in the particular location, a channel of the plurality of channels is located between pairs of support features of the plurality of support features in the at least one plate support area, so that the plate support features in the rack and the channels in the mat can simultaneously support a plate located in the at least one plate support area.

12. The sink dish drainer set of claim 11, the rack further comprising a utensil basket in which silverware can be placed.

13. The sink dish drainer set of claim 11, the rack further comprising a second plate support area which does not utilize the plate support features of the mat.

14. A sink dish drainer set, comprising:
a mat;
a rack;
wherein the rack has hollow feet;
wherein the mat has projections which accept the hollow feet, a rim and a drainage area;
wherein the rack includes a first plate support area that sits above a raised rib on the top surface of the mat, where the rib has at least one channel located along the top of the rib, perpendicular to the axis of the raised rib's length, where the channel supports a plate that is located in the first plate support area, the raised rib having an axis oriented such that the axis of the raised rib intersects a side of the mat incorporating a drainage area from which water can drain from the mat;

wherein the rack includes a plurality of plate support features located in the first plate support area that support plates located in that area;

wherein the rack and the mat are constructed and arranged to be coupled such that the rack sits on the mat in a particular location where the at least one channel of the raised rib of the mat is located between a pair of plate support features of the plurality of plate support features in the at least one plate support area of the rack, so that the plate support features in the rack and the channels in the mat can simultaneously support a plate located in the at least one plate support area, wherein the plurality of plate support features of the first plate support area further comprise a series of parallel louvers that are spaced from and parallel to each other and are perpendicular to the raised rib on the top surface of the mat;

wherein the rack further comprises two spaced ribs that are spaced from and parallel to each other and parallel to the raised rib on the mat, connecting and supporting the parallel louvers between which plates may be inserted and where the tops of the parallel louvers are located in a plane so as to define a flat region that can support various kitchen objects for drying;

wherein the rack further comprises upward facing prongs along the sides of the rack on which objects can rest;

wherein the rack has a utensil basket in which silverware can be placed; and wherein the rack further comprises a second plate support area which does not utilize mat plate support features.

* * * * *